(12) United States Patent
Stewart et al.

(10) Patent No.: US 8,037,411 B2
(45) Date of Patent: Oct. 11, 2011

(54) METHODS FOR REMOVING IMAGING ARTIFACTS WHEN FOLDING 3D OBJECTS THAT REPRESENT DUPLEX MEDIA

(75) Inventors: Terry L. Stewart, Torrance, CA (US); Timothy M. Enloe, Pleasant Hill, CA (US)

(73) Assignee: Xerox Corporation, Norwalk, CT (US)

( * ) Notice: Subject to any disclaimer, the term of this patent is extended or adjusted under 35 U.S.C. 154(b) by 825 days.

(21) Appl. No.: 12/041,178

(22) Filed: Mar. 3, 2008

(65) Prior Publication Data

US 2009/0222724 A1 Sep. 3, 2009

(51) Int. Cl.
*G06F 17/00* (2006.01)
(52) U.S. Cl. ......... 715/273; 715/200; 715/274; 715/277
(58) Field of Classification Search .............. 715/273, 715/274, 277, 200
See application file for complete search history.

(56) References Cited

U.S. PATENT DOCUMENTS

| | | | | |
|---|---|---|---|---|
| 5,808,614 | A * | 9/1998 | Nagahara et al. | 715/848 |
| 5,815,786 | A * | 9/1998 | Isemura | 399/376 |
| 6,243,074 | B1 * | 6/2001 | Fishkin et al. | 345/156 |
| 6,311,142 | B1 | 10/2001 | Glassner | |
| 6,545,680 | B1 | 4/2003 | Delas et al. | |
| 6,924,822 | B2 * | 8/2005 | Card et al. | 345/660 |
| 6,964,016 | B2 * | 11/2005 | Iwasaki | 715/253 |
| 7,814,430 | B2 * | 10/2010 | McComber | 715/771 |
| 2003/0140315 | A1 * | 7/2003 | Blumberg et al. | 715/527 |
| 2006/0114490 | A1 | 6/2006 | Rolleston | |
| 2007/0097203 | A1 * | 5/2007 | Yamada et al. | 347/261 |
| 2007/0143671 | A1 * | 6/2007 | Paterson et al. | 715/527 |
| 2008/0141151 | A1 * | 6/2008 | Saur | 715/764 |

OTHER PUBLICATIONS

T. Buchner, "Kinematics of 3D Folding Structures for Nanostructured Origami", *MIT Department of Mechanical Engineering*, (Dec. 2003).

P. Mercurio, "3-D Hardcopy: The Hosoya Cube", *Pixel*, (Mar.-Apr. 1991).

* cited by examiner

*Primary Examiner* — Cesar Paula
*Assistant Examiner* — David Faber
(74) *Attorney, Agent, or Firm* — Oliff & Berridge, PLC

(57) ABSTRACT

A method for pre-print visualization of a 3D object that represents opposite faces of a document is described. The method includes manipulating two 3D objects that represent opposite faces of a document in parallel such that they do not intersect while being animated in a folding operation.

15 Claims, 8 Drawing Sheets

METHODS FOR REMOVING IMAGING ARTIFACTS WHEN FOLDING 3D OBJECTS THAT REPRESENT DUPLEX MEDIA

This nonprovisional application claims the benefit of U.S. Provisional Application No. 60/893,252, filed Mar. 6, 2007.

BACKGROUND

The present disclosure relates to a method for document production visualization (DPV), and more particularly, to a method for the animated viewing of 3D images of a document, either in a final state or at several stages of the production of the document, so as to provide a representative illustration of the document for use in proofing the document before production, as well as during and after production.

One aspect of document production visualization (DPV) is the virtual rendering of the document being described by standardized input. This virtual rendering has the advantage of being able to "see" and manipulate in 3D, the document before time and materials are committed to the production process. The document can be viewed, as it should appear in a final, finished form, or at any stage of a production process.

Tilman Buchner, *Kinematics of 3D Folding Structures for Nanostructured Origami*, (December 2003), describes that 3D Optical Systems Group at MIT investigates Nanostructured Origami™ 3D fabrication and assembly. The idea is to assemble complex hybrid (chemical or biological reactors, optical sensing, digital electronic logic, mechanical motion) systems in 3D by using exclusively 2D lithography technology. The 3D shape is obtained by folding the initial 2D membrane in a prescribed way, in a manner reminiscent of the Japanese art of origami (paper-folding). The patterning method (2D nanolithography, nanoimprinting and other techniques) as well as the actuation principle (Lorentz force actuation), which is responsible for initializing the folding process, have already been developed and established. The primary objective of this thesis is to determine the motions required to reach the goal (folded state) from the given initial state (unfolded). A combination of bodies, which are connected by joints, is used to describe the crease structure. As a result, the crease structure is represented in terms of a closed-loop Multi Body System (MBS) with the property that a change of relative motion at one location induces a change of relative motion elsewhere. To describe this system, a mathematical method, called screw calculus, is applied. By cascading several screws together, one can describe the motion of articulated rigid body systems, such as robotic manipulators and, in this case, origami.

Philip J. Mercurio, *3-D Hardcopy: The Hosoya Cube*, (March-April 1991), describes that in print, 3-D structure can be communicated in a number of ways. A few well-chosen views of the structure can be presented, using perspective, shading, transparency, and other rendering techniques to enhance the photorealism of each view. Stereoscopic pairs of images can be printed, to further aid the perception of the 3-D structure. The choice of views is made by the researcher, who may unintentionally bias the viewer towards a particular perception of the structure. Another approach, commonly seen in architectural graphics, is to present top, side, and front views of the same structure. Here, the choice of views is taken out of the hands of the presenter, providing the viewer with a standard visual framework to aid perception of the structure. However, the 3-D relationships between the three views, printed side-by-side on one flat sheet of paper, still need to be mentally reconstructed by the viewer. The approach suggested here is to print six views of an object, the six faces of a cube encompassing the structure, in such a manner that a paper cube can easily be constructed from the printed sheets. The advantage of the paper cube is its physicality—the viewer can readily perceive the spatial relationships between parts of the structure as seen in the six views, because the relationships between the views is encoded by their positions on the surface of the cube. The paper cube is a cheap, portable, reproducible means of delivering some of the interactive advantages inherent in a 3-D workstation display.

Currently, there is interactive development environment for design and placement of tiered geometrical objects, such as objects used in pop-up card designs. Relations between objects are represented mathematically, allowing computerized modeling and enforcement of design constraints. For example, in the context of pop-up cards, a card that cannot close will not be allowed. A dependency hierarchy is used to track different objects of a card. Card objects are instantiated as related to other card objects so that changes to one card object can be appropriately propagated to related objects. If all card objects are defined with respect to a base card, an entire card design can be animated by only adjusting, for example, "opening" and "closing," the base card. A graphical interface provides drag-and-drop and manual forms of placing card parts. For drag-and-drop, design constraints can be used to automatically determine proper positioning of card pieces. Graphics can be associated with card parts, and such graphics are automatically adjusted, for example, adjusting perspective for proper viewing of the image on a particular card piece.

In addition, there are also methods and systems for computer-aided design and more particularly computer-aided design of sheet parts. The methods include defining a feature in a definition view based on a specification defined by a user and generating the feature in the definition view. The alternative view is then updated. This updating includes analyzing the defined feature to determine if it can be made available to an alternative view, and representing the defined feature in the alternative view. The definition view and the alternative view include a folded view and an unfolded view.

Further, there are systems and methods for pre-print visualization of a job to be printed are described. The methods include submitting the content of the printing job, and associated printing environment data, in order to create a virtual rendering of the job in 3D on a user interface. In one embodiment, the rendering may be a low-resolution rendering and in another embodiment or later step, the virtual rendering would employ print-quality representations of content. The virtual rendering further allows a user to observe job-specific aspects and change a point of view relative to the rendering, including selecting and viewing individual pages of the print job. The methods and systems may be employed to facilitate obtaining user approval for production of the print job before forwarding the job for production.

However, viewing of folding of a 3D object that represents two faces of a document is currently problematic.

In 3D modeling, objects that make up faces of a document are defined by vertices. These vertices are manipulated to give an appearance to a user that the document is being folded. However, an act of manipulating these vertices to simulate a fold operation can easily allow the faces to appear to cross or intersect with one another, producing an unrealistic folding operation. The difficulty in performing this folding operation is to keep two independent 3D objects that represent two sides of the document from intersecting or becoming too close to one another and introducing unrealistic folding conditions or artifacts.

For example, with reference to FIGS. 3-6, the edge of a fold 202 on an inner-side page object 204 may pierce through an outer-side page object 206 at certain angles of folding unless corrective action is taken. Also, points 208 and 212 of inner-side page object 204 may pierce through points 210 and 214 of outer-side page object 206 unless corrective action is taken. Also, if the page objects are too close together while in a semi-parallel state, a computer's graphics card can have trouble determining which face is nearer a viewer, potentially causing random switching between the two faces until they are moved further apart (that is, a Z-buffer problem in computer graphics).

SUMMARY

Various document production visualization (DPV) methods are described herein to provide computer-implemented manipulation of two 3D objects that represent opposite faces of a document in parallel such that they do not intersect while being animated in a folding operation.

The various methods for manipulating graphical data include slightly shifting an entire folded section of a back face horizontally away from a fold when a folding animation is between about a 70° to about a 135° point, extending only the points of the back face near a fold line away from the fold when the folding animation is past about an 80° point, slightly shifting the entire folded section of the back face vertically away from the fold when the folding animation is past about a 90° point, crushing points of a front face near the fold line toward the fold when the folding animation is past about a 100° point, and pinching points of the front and back faces near the fold line that are part of previously folded sections.

The DPV methods described herein are advantageous because they make it unnecessary to produce and provide proof versions of a document to be printed, yet enable a similar level of review and approval by a user by visual display of a 3D representation of a document to be printed showing a folding operation. The DPV methods will thus allow the user to quickly reach a decision of approval or denial to pursue a print job, while eliminating any possibility of ambiguity.

EMBODIMENTS

Figure 1:
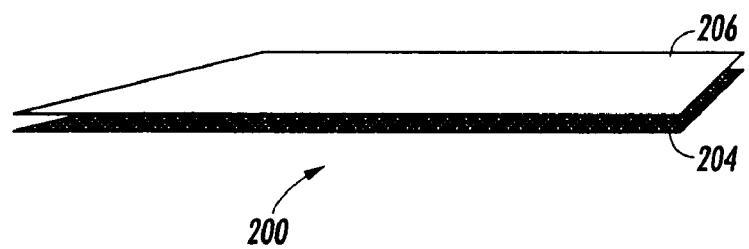
FIGS. 1-11 are illustrative views of folding a 3D object.
Figure 2:
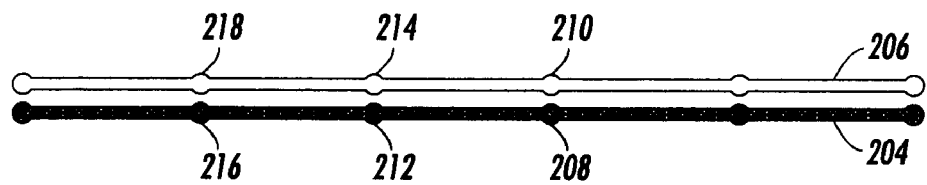

In 3D modeling, objects that make up each face of a document are defined by vertices. FIG. 1 is an illustrative view of front and back faces of a document 200 in a 3D model. The graphical representation illustrated in FIG. 1 may be viewable using any suitable graphic interface, for example, LCD, CRT, LED screens and the like, associated with a device, including a printing device (described below). The document 200 includes a front face 206 and a back face 204. Front face 206 represents a first image object, that is, the image object to be displayed on the front of document 200, and back face 204 represents a second image object, that is, the image object to be displayed on the back of document 200. Vertices are then manipulated to give an appearance to a user that the document 200 is being folded. However, the act of manipulating vertices to simulate a fold operation can easily allow the faces to appear to cross or intersect with one another, producing an unrealistic folding operation. For example, with reference to FIG. 2, during a 180° fold operation, crossover or intersection events occur at varying points, for example, at vertices 208, 210, 212, 214, 216 and 218. Therefore, various methods may be required to manipulate these vertices such that they do not intersect while being animated in a folding operation.

Figure 12:
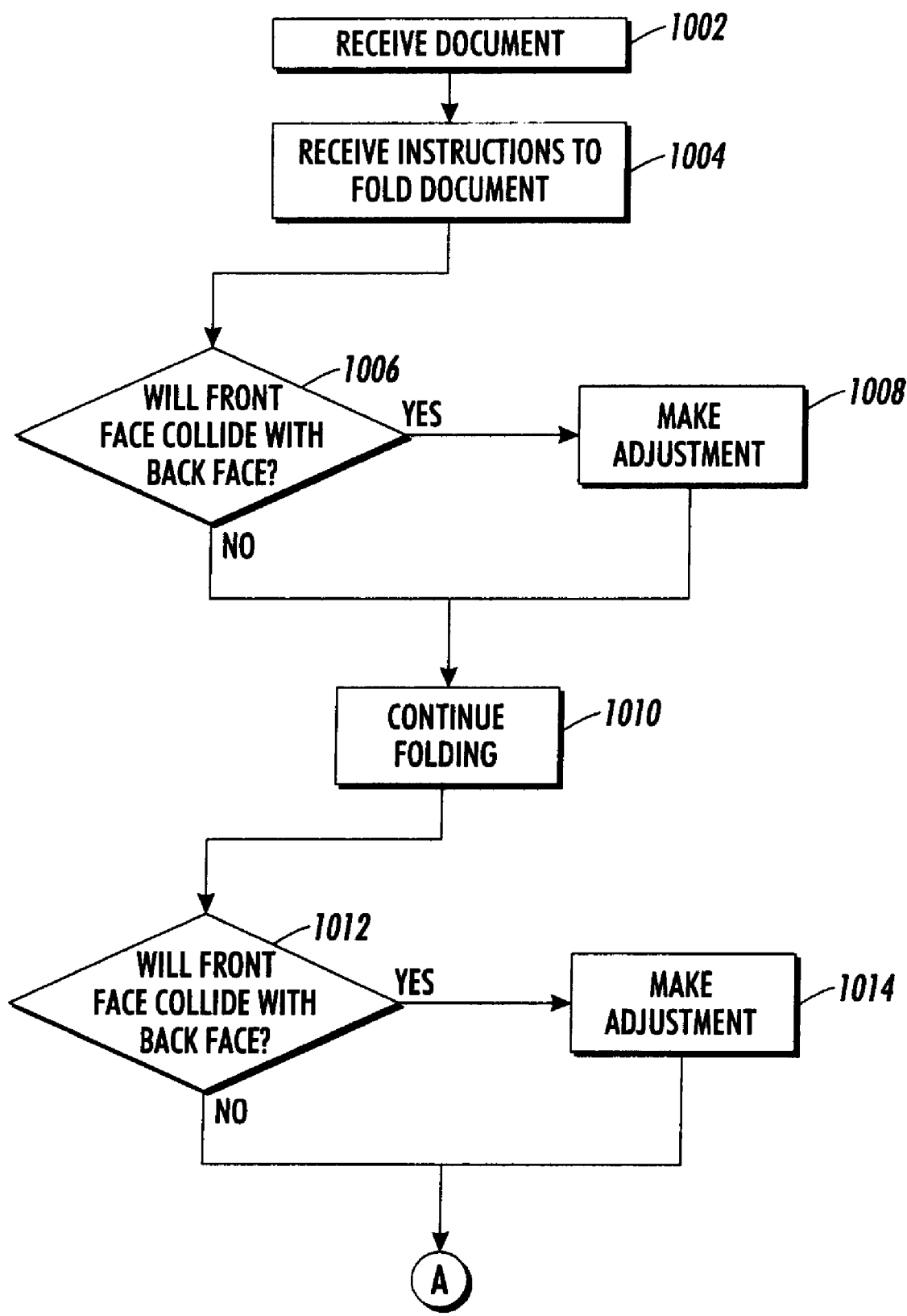
FIGS. 12-14 is a flow chart of a method for folding 3D objects representing opposite faces of a document in accordance with the present disclosure.
Figure 13:
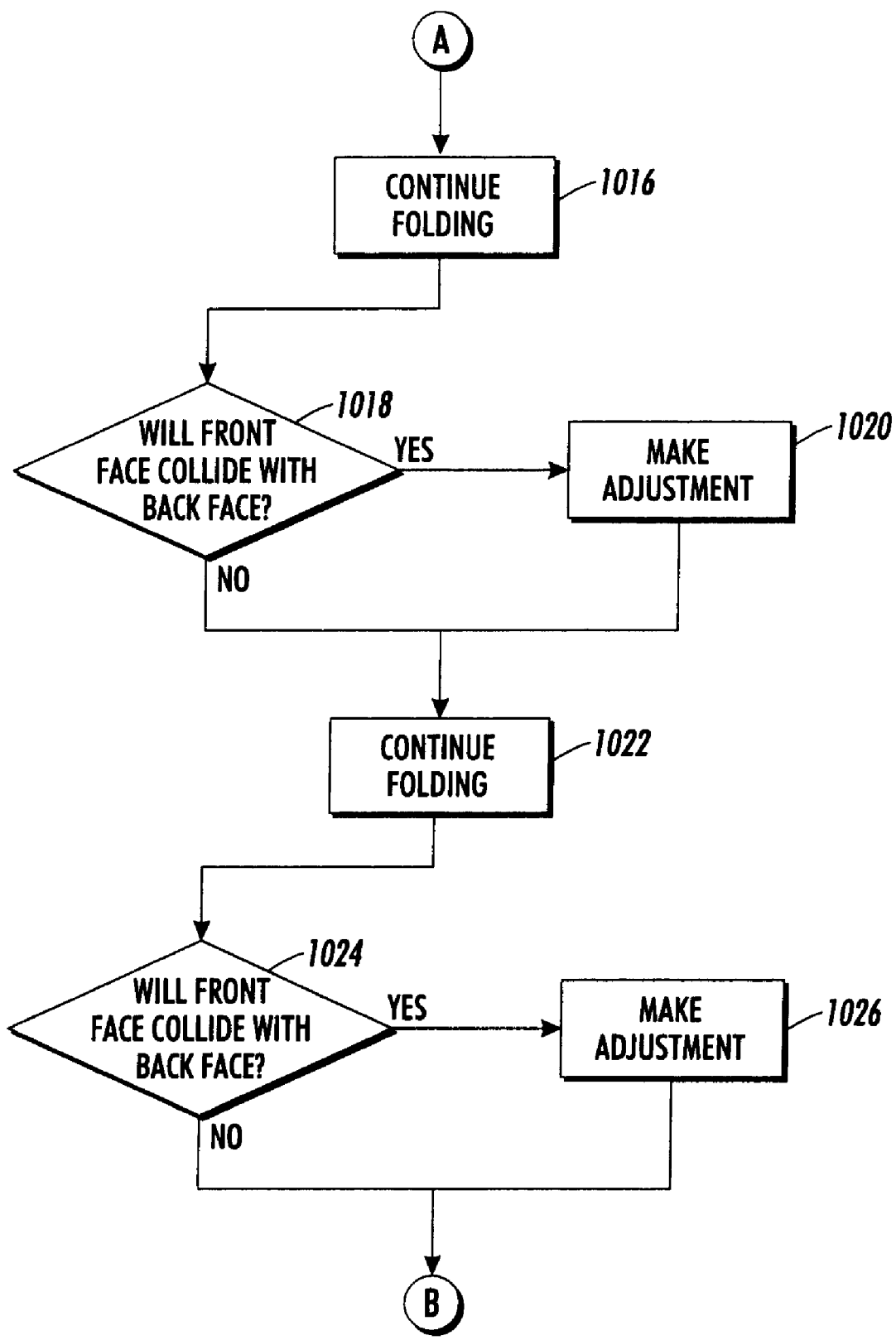
Figure 14:
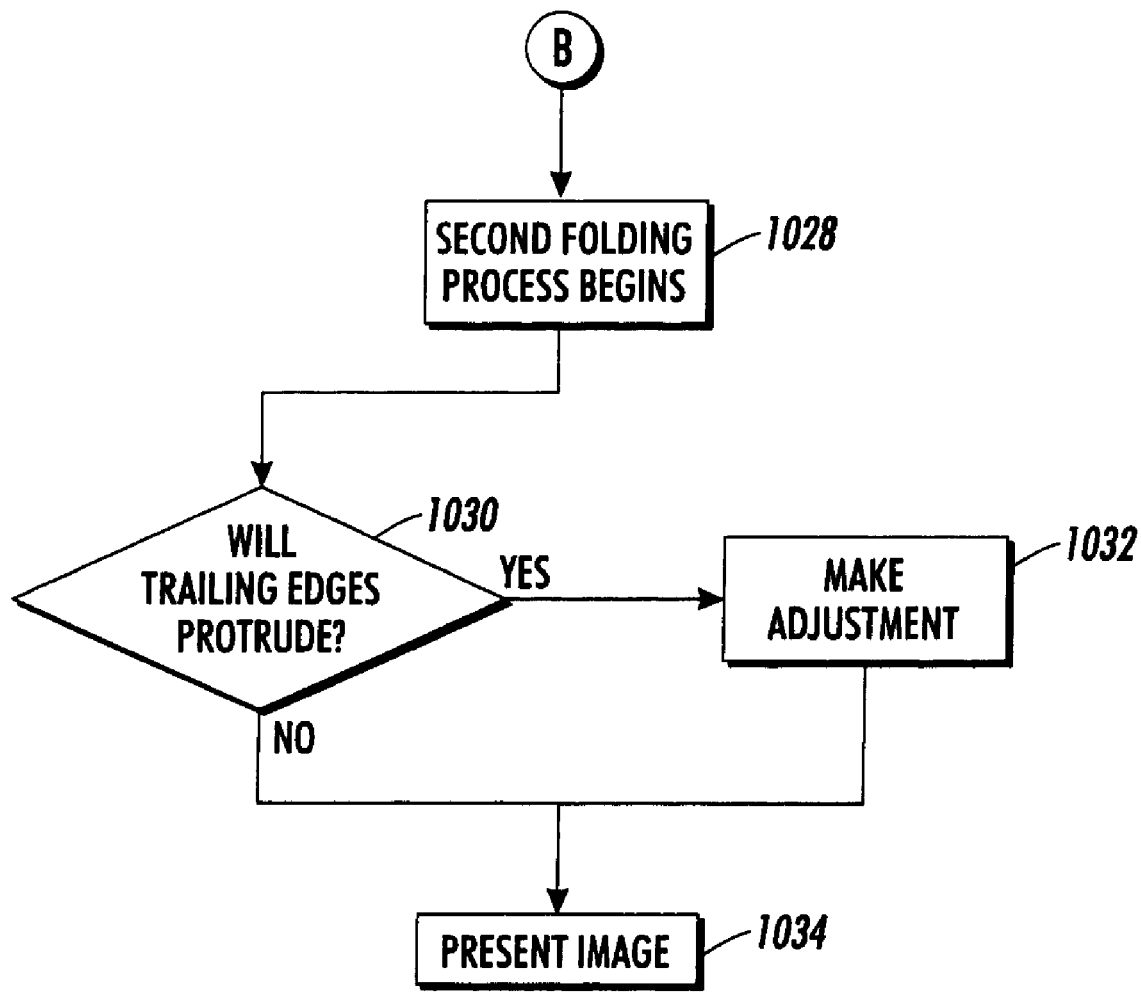

FIGS. 12-14 provide a flow chart of a method according to embodiments disclosed herein for folding 3D objects representing opposite faces of a document. One of ordinary skill in the art will appreciate that the continuous folding process of document 200, beginning with FIG. 12 and ending at FIG. 14, is shown in sequential order for clarity and readability and therefore various other folds exist and the act of manipulating vertices to simulate a fold operation described below is only exemplary.

With reference now to FIG. 12, at block 1002, a document is received where each side of the document contains a different page image. With reference back to FIG. 1, document 200 includes a front face 206 and a back face 204. Front face 206 represents a first image object, that is, the image object to be displayed on the front of document 200, and back face 204 represents a second image object, that is, the image object to be displayed on the back of document 200.

At block 1004, instructions are received to fold document 200, such as a 180 degree fold along the line of document 200. However, as mentioned above, a problem occurs if front face 206 and back face 204 begin to collide during the graphic folding. At block 1006, a determination is made as to whether or not front face 206 and back face 204 will collide if graphically folded as instructed.

Figure 3:
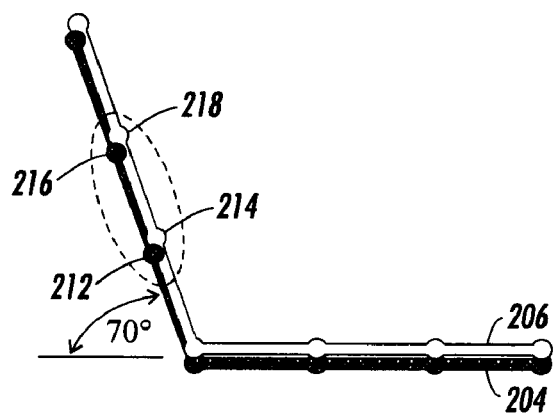

With reference now to FIG. 3, it can be seen that when folding graphically along the designated fold line, and at about a 70 degree point, a first problem arises when vertices 212 and 216 of back face 204 begin to collide with vertices 214 and 218 of front face 206. Once a determination is made that points of front face 206 and back face 204 will collide if folding continues, at block 1008 of FIG. 12, an adjustment can be made. For example, the back face vertices may be shifted away from folded area 202 shown in FIG. 4.

Figure 4:
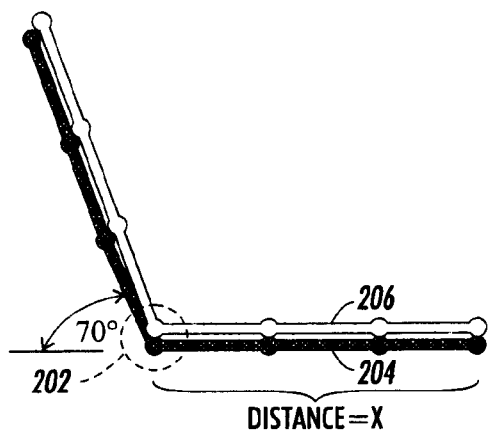

With reference now to FIG. 4, an illustrative example of the back face vertices being shifted horizontally away from fold area 202 is shown. This corrects the first problem, and graphic folding of the object can then continue. As the folding process continues at block 1010 in FIG. 12, a determination is made at block 1012 as to whether or not front face 206 will again collide with back face 204 during continued graphic folding.

Figure 5:
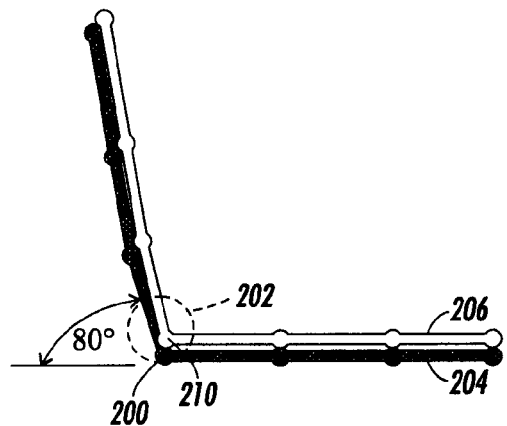

With reference now to FIG. 5, it can be seen that at about an 80° point, vertices 210 of front face 206 begin to protrude through vertices 208 of back face 204 at fold 202, thereby resulting in a second problem in the folding operation. Because it is only the immediate area near fold 202 that is in jeopardy at this point, at block 1014 of FIG. 12 an adjustment can be made by moving the back face vertices in this area to "extend" the back face's fold area to avoid the collision.

Figure 6:
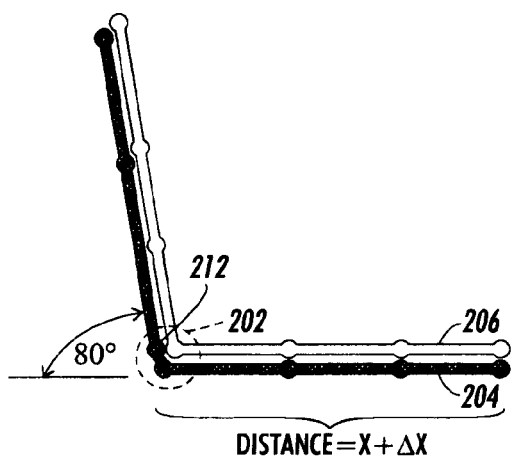

With reference now to FIG. 6, an illustrative example of the back face vertices being shifted downwards and away from fold 202 is shown. Notice that back face vertices 212 are shifted downward towards fold area 202 and at the same time pushed away from fold area 202 by an amount labeled delta X ($\Delta X$). This is done in order to allow back face 204 to be redefined to extend around the protruding front face 206's fold line. The graphic folding may then continue.

With reference now to FIG. 13, as the folding process continues at block 1016, another determination is made at block 1018 as to whether or not front face 206 will again collide with back face 204.

Figure 7:
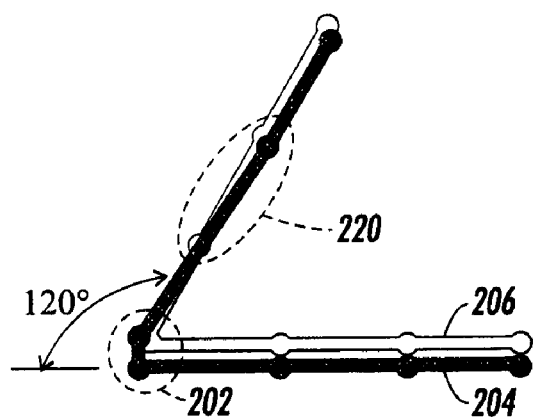

With reference now to FIG. 7, as the folding process passes about a 90° point, a third problem is realized when front face 206 begins to overtake back face 204. However, to better illustrate, the problem is shown at about the 120 degree point. At block 1020 of FIG. 13, a further adjustment can be made to the back face vertices. The back face vertices are shifted vertically away from the fold area 202 to position the back face 204 on a correct side of front face 206. Only the vertices on the back face 204 that are away from an immediate fold are affected by this adjustment, because the back face 204 vertices immediately near the fold area 202 do not exhibit this problem due to the effects of the adjustment at block 1014 above.

Figure 8:
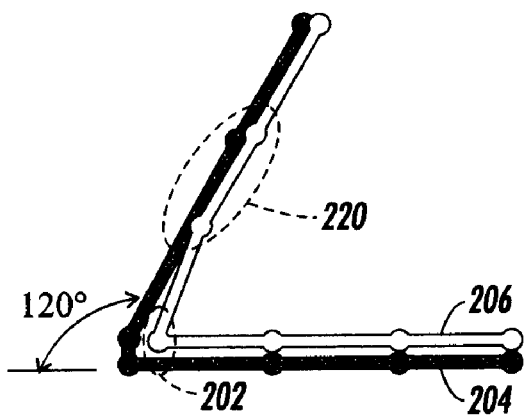

With reference to FIG. 8, an illustrative example of the back face vertices being shifted vertically away from the fold area 202 to position the back face 204 on a correct side of front face 206 is shown.

As the folding process continues at block 1022 of FIG. 13, another determination is made at block 1024 as to whether or not front face 206 will again collide with back face 204.

With reference back to FIG. 7, a further problem is illustrated as the folding process passes about a 100° point, wherein front face 206 begins to protrude through back face 204. However, to better illustrate, the problem is shown at about the 120° point. At block 1026 of FIG. 13, an adjustment is made to the front face vertices. To address this problem, the front face vertices near area 220 are shifted horizontally away from the area 220. Only the vertices on the front face 206 that are near the area 220 are affected by this adjustment, because the front face vertices away from area 220 do not exhibit this problem due to the their distance away from the fold line.

With reference back to FIG. 8, an illustrative example of the front face vertices near area 220 being shifted horizontally from area 220 is shown.

Figure 9:
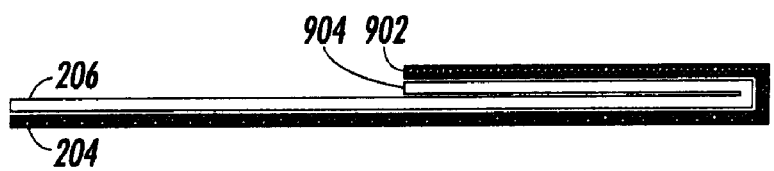

With reference now to FIG. 9, an illustrative view of a completed 180° first fold is shown. A second fold will now take place at area 902 where trailing edges of the first 180° fold, located at point 904, overlaps a fold line for the second fold. However, as the second folding process begins at block 1028 of FIG. 14, a determination is made at block 1030 as to whether or not the trailing edges 904 of front face 206 and back face 204 begin to protrude through front face 206 and back face 204, which are being moved in the second fold.

Figure 10:
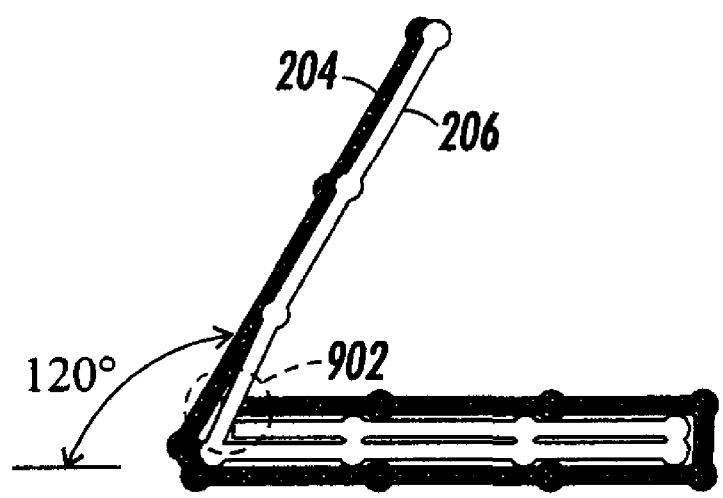

With reference now to FIG. 10, as the second fold progresses, the trailing edges 904 of front face 206 and back face 204 may begin to protrude through front face 206 and back face 204, which are being moved in the second fold. Therefore, at block 1032 of FIG. 14, an adjustment is made to trailing edges 904. The trailing edges 904 of front face 206 and back face 204 are simultaneously shifted horizontally away from the second fold area 902 and vertically down towards the fold line. This, in essence, crushes and pinches the trailing edges 904 of the first fold to make room for the second fold.

Figure 11:
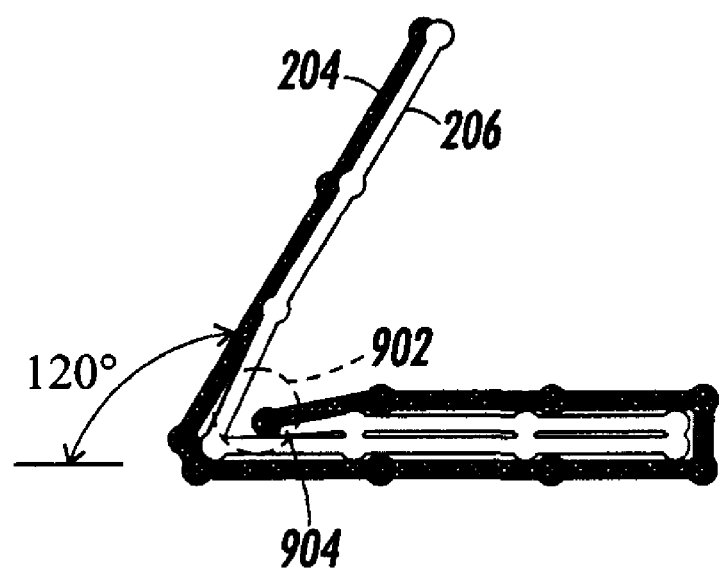

With reference now to FIG. 11, an illustrative example is shown of the trailing edges 904 of front face 206 and back face 204 shifted horizontally away from the second fold area 902 and vertically down towards the fold line crushing and pinching the trailing edges 904 of the first fold to make room for the second fold.

When the above process is complete, at block 1034 in FIG. 14, a final image is presented to the user for approval. The image accurately depicts the fold and images on each side of the document and fold line. A user can thus accurately determine before printing if the image, as viewed graphically, is suitable. Adjustments can therefore be made before printing.

Various problems that may arise during graphic folding of an object, and solutions thereof, are detailed above. The present methods thus address common 3D graphic folding problems. Any one, more than one, or all of the problems may arise in a given graphical folding procedure. In the methods, the folding is continually checked and, if and when a problem of overlapping vertices is determined, appropriate adjustments of the vertice positions in the graphic are made to eliminate the overlap and to permit the graphic folding to continue without misleading display to a user.

Figure 15:
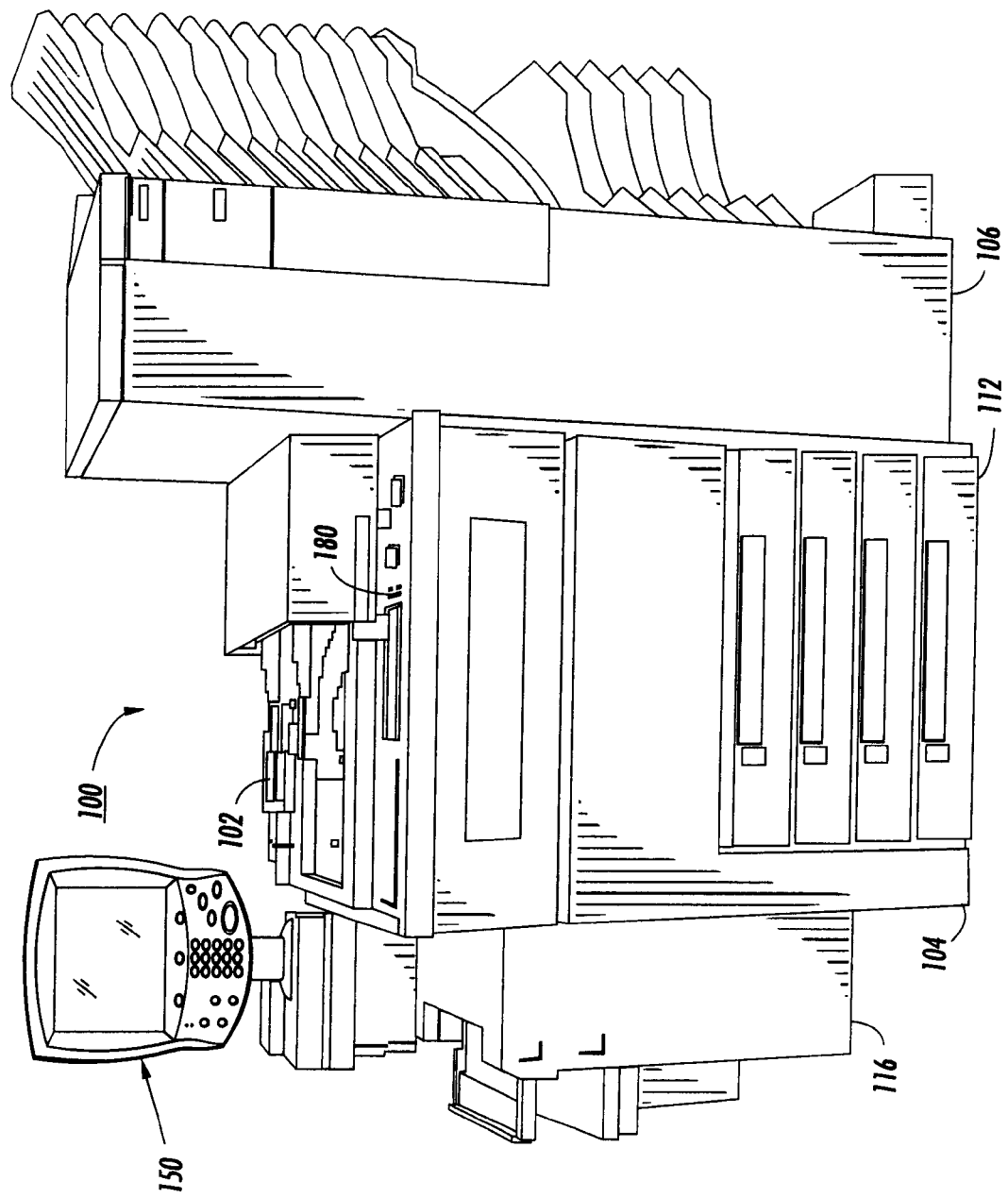
FIG. 15 is a perspective view of a printing system for displaying and printing a folding operation in accordance with the present disclosure.

As mentioned above, a graphical representation illustrated in FIG. 1 may be viewable using any suitable graphic interface, for example, LED screens CRTs, LCDs, and the like, associated with a device, including a printing device or xerographic device. FIG. 15 provides an exemplary image printing system 100 of the type capable of implementing any of the flowcharts shown in FIGS. 12-14. Thus, printing system 100 can be used to implement a 3D modeling system that models a document for visual depiction without intersection of front and back sides during a folding operation in accordance with the present disclosure Printing system 100 includes a scanning device 102, a printing module 104 and a user interface (UI) 150. The printing system 100 may also include a finisher device 106 that may be a sorter, tower mailbox or stapler, and at least an electronic subsystem (ESS) controller (not shown) for controlling all the features and functions of the printing system 100. The printing module 104 may include a plurality of paper trays 112 that store image carrying media such as paper that is used in the printing process. Lastly, the printing system 100 may include a high capacity feeder 116 that is capable of holding large amounts of media or paper stock to be used by the machine. The printing system 100 has both remote and on-site image inputs, enabling printing system 100 to provide network, scan, and print services. Other system combinations may be envisioned, such as a stand alone printing system with an on-site image input (for example, a scanner), controller, and printer; a network printing system with remote input, controller, printer and the like.

For on-site image input in a typical scanning function, the operator would utilize the scanning device 102 to scan in images from original documents. This scanning device 102 may be a platen type scanner or may include a constant velocity transport system that moves the original documents across a stationary scanning device. Moreover, the scanning device 102 may also include a document handling system that is capable of placing the original documents, automatically, on the glass platen for scanning.

For off-site image input, printing system 100 may have a network with a suitable communication channel such as a internet connection, wireless connectivity, or a telephone line enabling image data in the form of image signals or pixels from one or more remote sources to be processed. In embodiments, where the Page Description Language (PDL) of the incoming imaging data is different than the PDL used by printing system 100, suitable conversion means (not shown) are provided. In further embodiments, other remote sources of image data such as streaming tape, floppy disk, portable memory cards, flash drives, handheld devices and the like may be envisioned.

As seen in FIG. 15, the UI 150 comprising a combined operator controller display provides a screen and a keypad. In embodiments, a suitable UI 150 may include, for example, LCD, CRT, LED screens and the like. UI 150 interfaces the operator with printing system 100, enabling the operator to program print jobs and other instructions such as a folding operation, and to obtain system operating information, visual of a folding operation, programming information and icons, diagnostic information and pictorial views and the like.

Further, instructions for performing the methods of FIGS. 12-14 can be stored in volatile and/or non-volatile alterable memory or non-alterable memory within printing system 100. Alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Printing system 100, as shown in FIG. 15, may include a laser type printer with a raster output scanner (ROS). A ROS uses plural laser beams modulated in accordance with the content of an image signal input by acousto-optic modulator to create latent electrostatic images on a photoreceptor. The latent electrostatic images are developed, transferred and fixed to a print media. The finished prints are delivered to either a tray or to finisher 106, which may provides certain finishing selections such as a stitching, stapling and the like.

While a specific printing system is shown and described, the present disclosure may be used with other types of printing systems. For example, printing system 100 may instead use a different printer type such as ink jet, ionographic, thermal, photographic and the like, and furthermore may be incorporated in electronic display systems, such as CRTs, LCDs, LEDs and the like, or else other image scanning/processing/recording systems, or else other signal transmitting/receiving, recording systems and the like as well. Additionally, it should be appreciated that the number of print media or paper trays can be expanded considerably through use of one or more modules.

It should be appreciated that the 3D modeling illustrated in FIGS. 1-11 can also be implemented on a general purpose computer. However, it should also be appreciated that the 3D modeling can also be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing any of the flowcharts shown in FIGS. 12-14 can be used to implement a 3D modeling system that models a document for visual depiction without intersection of front and back sides during a folding operation.

It will be appreciated that various of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A computer-implemented method for manipulating graphical data, comprising:

a) receiving data representing a single document with a front face and a back face, b) receiving, by a computer, a computer command to simulate folding the single document;

c) representing the document to a user as two separate documents, wherein the front face of the single document is presented as a first document and the back face of the single document is presented as a second document;

d) determining whether the first document and the second document intersect during execution of the received computer command;

e) adjusting at least one of the first document and the second document to prevent the first document and the second document from intersecting during execution of the folding instructions; and f) presenting a graphical visual representation of the folded first and second documents to the user, wherein the graphical visual representation graphically displays execution of the computer command to the user, wherein the documents each have a first and second endpoint, wherein the second endpoint of each of the first document and the second document remains stationary during an execution of a first fold, and wherein an entire first folded section of an outer face of the documents is slightly shifted horizontally away from the executed first fold when the first fold is at least 70°.

2. The computer-implemented method according to claim 1, wherein only points of an outer face of the documents near an executed first fold line are vertically extended toward the first fold when the first fold is about 80°.

3. The computer-implemented method according to claim 1, wherein the points of an outer face of the documents away from an executed first fold line are slightly shifted horizontally away from the first fold when the first fold is about 120°.

4. The computer-implemented method according to claim 1, wherein when the first fold is about 180°, a second fold is initiated at a second fold section near the first endpoints of the documents.

5. The computer-implemented method according to claim 1, wherein the first end points of the documents are slightly shifted horizontally away from a second fold section when the second fold is about 120°.

6. The computer-implemented method according to claim 1, wherein the first end points of the documents are slightly shifted vertically down towards a second fold line so that the first end points of the documents make room for a second fold when the second fold is about 120°.

7. A non-transitory computer-readable storage device containing computer-executable instructions for causing a computer to perform a method for manipulating graphical data, the method comprising:

a) receiving data representing a single document with a front face and a back face, b) receiving, by a computer, a computer command to simulate folding the single document;

c) representing the document to a user as two separate documents, wherein the front face of the single document is presented as a first document and the back face of the single document is presented as a second document;

d) determining whether the first document and the second document intersect during execution of the computer command;

e) adjusting at least one of the first document and the second document to prevent the first document and the second document from intersecting during execution of the computer command; and f) presenting a graphical visual representation of the folded first and second documents to the user, wherein the documents each have a first and second endpoint, wherein the second endpoint of each of the first document and the second document remains stationary during an execution of a first fold, and wherein an entire folded section of an outer face of the documents is slightly shifted horizontally away from the executed fold when the fold is at least 70°.

8. The non-transitory computer-readable storage device according to claim 7, wherein the graphical visual representation graphically displays execution of the computer command to the user.

9. The non-transitory computer-readable storage device according to claim 7, wherein an entire folded section of an outer face of the documents is slightly shifted horizontally away from the executed fold when the fold is about 80°.

10. The non-transitory computer-readable storage device according to claim 7, wherein only points of an outer face of the documents near an executed first fold line are vertically extended toward the first fold when the first fold is about 80°.

11. The non-transitory computer-readable storage device according to claim 7, wherein the points of an outer face of the documents away from an executed first fold line are slightly shifted horizontally away from the first fold when the first fold is about 120°.

12. The non-transitory computer-readable storage device according to claim 7, wherein when the first fold is about 180°, a second fold is initiated at a second fold section near the first endpoints of the documents.

13. The non-transitory computer-readable storage device according to claim 7, wherein the first end points of the documents are slightly shifted horizontally away from a second fold section and vertically down towards a second fold line so that the first end points of the documents make room for a second fold when the when the second fold is about 120°.

14. The non-transitory computer-readable storage device according to claim 7, wherein the first end points of the documents are slightly shifted vertically down towards a second fold line so that the first end points of the documents make room for a second fold when the second fold is about 120°.

15. A computer-implemented method for manipulating graphical data, comprising:
   a) receiving data representing a single document with a front face and a back face,
   b) receiving instructions to fold the single document;
   c) representing the document to a user as two separate documents, wherein the front face of the single document is presented as a first document and the back face of the single document is presented as a second document;
   d) determining whether the first document and the second document intersect during execution of the received folding instructions;
   e) adjusting at least one of the first document and the second document to prevent the first document and the second document from intersecting during execution of the folding instructions by slightly shifting an entire folded section of a back face horizontally away from a fold when a folding animation is between about a 70° to about a 135° point, extending only the points of the back face near a fold line away from the fold when the folding animation is past about an 80° point, slightly shifting the entire folded section of the back face vertically away from the fold when the folding animation is past about a 90° point, crushing points of a front face near the fold line toward the fold when the folding animation is past about a 100° point, and pinching points of the front and back faces near the fold line that are part of previously folded sections; and
   f) presenting a graphical visual representation of the folded first and second documents to the user.

* * * * *